June 9, 1964     KARL-AUGUST WÄCHTER     3,136,617
AIR FILTER CONTAINER
Filed Sept. 25, 1961
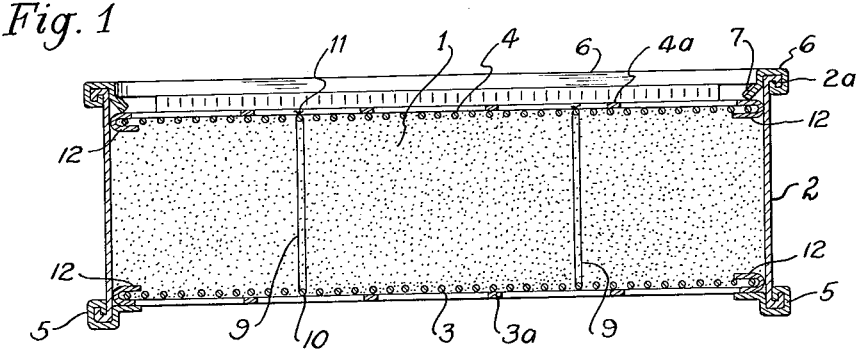
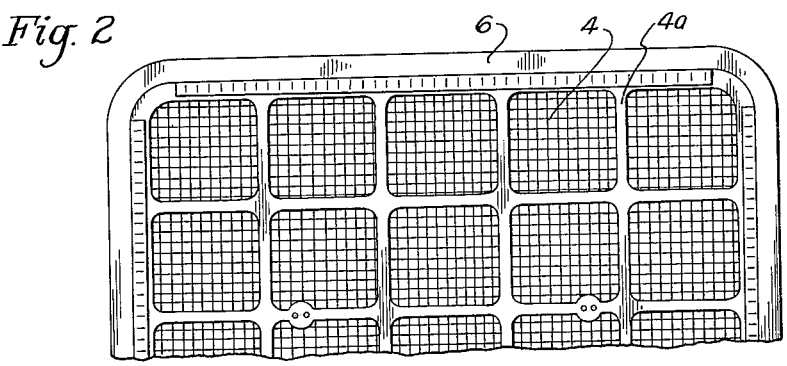
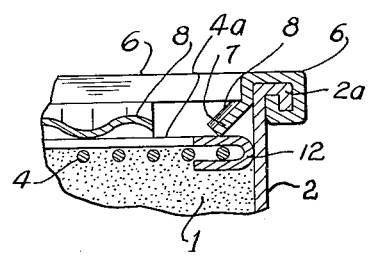
INVENTOR
Karl-August Wächter
BY
Bailey, Stephens & Huettig
ATTORNEYS United States Patent Office 3,136,617
Patented June 9, 1964

3,136,617
AIR FILTER CONTAINER
Karl-August Wächter, Lubeck, Germany, assignor to
Otto Heinrich Drager, Lubeck, Germany
Filed Sept. 25, 1961, Ser. No. 140,528
Claims priority, application Germany Dec. 5, 1960
1 Claim. (Cl. 55—519)

This invention relates to an air filter and, in particular, to the construction of a container for the filter material.

Filters are used to clean gases from other gases as, for example, to clean noxious gases from air. These filters contain among other things granular particles of filter material, such as activated carbon. Other filter materials are also used.

Ordinarily the granular filter material is placed in a housing or container composed of metal or other material, and the granular material is secured between foraminated sheets, such as sieves or perforated sheets which are fastened within the housing. In order that the filters offer as little as possible resistance to the passage of a gas, for example air, flowing through the filter, it is desirable to give the filter as large a cross-section as possible, while at the same time, to make the filter as small as possible. In so doing, difficulties are encountered in the placing of the filter material which should be uniformly and evenly distributed throughout the filter so as to provide a uniform resistance to air flow in all parts of the air filter. When the filter material is unevenly distributed, then some parts of the filter have a low air-flow resistance so that the gas being cleaned from the air flows through these low resistance points at an increased velocity. The efficiency of the filter is thus reduced. Also trouble arises in filters in which the granular filter material has shifted in the course of time. Also present is the danger in that voids are formed in the bed of filter material and also that the granular filter material shifts and compacts itself when the filter material is not uniformly and evenly distributed throughout the container.

The uneven distribution of the filter material is enhanced by the faulty fastening of the foraminated sheets which enclose the filter material in the container, such sheets being, for example, sieves, perforated bodies, and the like.

The object of this invention is to avoid the disadvantages of heretofore used filters. In this invention, the filter material for the air filter is held in a container by foraminated sheets, such as sieves, perforated surfaces, or the like. According to this invention, a closure flange is attached to the rim of the container housing and tensioned against the edge of the foraminated sheet to reinforce the same. This has the advantage of holding the filter material uniformly and evenly within the container so that a loosening and shifting of the filter material is prevented.

The means by which the objects of the invention are obtained are described more fully with reference to the accompanying drawings, in which:

FIGURE 1 is a cross-sectional view through an air filter according to this invention;

FIGURE 2 is an enlarged detail view of a portion of FIGURE 1; and

FIGURE 3 is a plan view of FIGURE 1.

As shown in FIGURE 1, the granular filter material 1 is held in a container housing 2 so that the filter can be placed wherever desired, as, for example, in a vehicle.

The air to be filtered flows through the filter either from the top to the bottom or vice versa. The air filter can be a single unit, such as shown in FIGURE 1, or it can be composed of several units placed parallel to each other or arranged in rows and contained in one or more housings.

The filter material 1 is composed of a granular material such as prepared activated carbon and is compacted evenly and strongly between the thin metal walls of container 2. The lower and the upper sides of container 2 are closed by the foraminated sheets 3 and 4, respectively. Lower sheet 3 is secured to a metal frame 5 by welds, solder, or sheet metal flanges, and the outer edge portion of frame 5 is secured to sheet metal housing 2 by a folded rolled joint. Before upper sheet 4 is put in place, the granular filter material is poured into the container and the filled container shaken in such a manner that the filter material is tightly packed in the container. Then upper sheet 4 is laid on top of the filter material. A metal frame 6 having four closure flanges 7 is used to hold sheet 4 in place. The frame 6 is attached to the upper edge or rim of housing 2 by a rolled joint. The container has a re-bent upper edge 2a which is interfitted with the corresponding re-bent edge of frame 6 and then the interfitted parts rolled or tightly pressed together. After this joint has been formed, the free edge of flange 7 is pressed downwardly and clamped against the peripheral edge of sheet 4. These flanges 7 tightly press sheet 4 against the granular filter material. The compression of the flanges 7 against the screens considerably increases the stability of the granular material contained in the housing 2. A further advantage lies in that, with this manner of construction, the tolerances between the forces acting on the bed of granular filter material are equalized. Flanges 7 can be given transversely directed corrugations 8 in order to stiffen the flanges.

The foraminated sheets 3 and 4 are prevented from bulging outwardly by being tied to each other with tie wires 9, rods or the like. The wires are first inserted through corresponding openings 10 in sheet 3. After the filter material has been inserted in the container, the free ends of the wires 9 are inserted through openings in upper sheet 4 and then twisted together to form a joint 11.

The foraminated sheets 3 and 4 can be reinforced by stiffening grill members 3a and 4a, respectively, having large air openings. In this case, the peripheral edge 12 of each grill member is bent around the edge of its foraminated sheet and clamped by the flange 7.

Having now described the means by which the objects of the invention are obtained, I claim:

In an air filter container having side walls including an upper edge, granular filter material placed within said container, and foraminated sheets forming the top and bottom, respectively, of said container, the improvement comprising tie wires extending between and joined to said foraminated sheets for preventing said sheets from bulging outwardly, corrugated closure flanges transversely inclined toward the interior of said container and secured to said upper edge by rebent ends on said flanges and said upper edge, interfitted and rolled pressed together to form a rolled joint, a stiffening grill member covering one of said foraminated sheets, and said flanges being bent inwardly to have their lower edges in tight reinforcing contact with the edge of said grill member to tigthtly compact said granular filter material in said container.

References Cited in the file of this patent

UNITED STATES PATENTS

| | | |
|---|---|---|
| 2,108,283 | Drew et al. | Feb. 15, 1938 |
| 2,329,248 | Carlson | Sept. 14, 1943 |
| 2,637,540 | Rowe | May 5, 1953 |
| 2,682,315 | Evans | June 29, 1954 |
| 2,754,928 | Hambrecht et al. | July 17, 1956 |
| 2,928,496 | Schneider | Mar. 15, 1960 |

FOREIGN PATENTS

| | | |
|---|---|---|
| 80,721 | Netherlands | Nov. 16, 1953 |